No. 895,959. PATENTED AUG. 11, 1908.
C. W. CARLSON & J. P. NYSTROM.
REEL FOR ROD MILLS.
APPLICATION FILED APR. 23, 1906.

2 SHEETS—SHEET 1.

Witnesses:
F. C. Swabb.
Jno. F. Oberlin.

Inventors,
Carl W. Carlson and John P. Nystrom
by their attorney,
J. B. Fay

No. 895,959. PATENTED AUG. 11, 1908.
C. W. CARLSON & J. P. NYSTROM.
REEL FOR ROD MILLS.
APPLICATION FILED APR. 28, 1906.

2 SHEETS—SHEET 2.

Witnesses:

Inventors,
Carl W. Carlson and John P. Nystrom,
by their attorney,
J. B. Fay.

UNITED STATES PATENT OFFICE.

CARL W. CARLSON AND JOHN P. NYSTROM, OF CLEVELAND, OHIO.

REEL FOR ROD-MILLS.

No. 895,959.    Specification of Letters Patent.    Patented Aug. 11, 1908.

Application filed April 28, 1906. Serial No. 314,194.

*To all whom it may concern:*

Be it known that we, CARL W. CARLSON and JOHN P. NYSTROM, both citizens of the United States, residents of Cleveland, county of Cuyahoga, and State of Ohio, have invented a new and useful Improvement in Reels for Rod-Mills, of which the following is a specification, the principle of the invention being herein explained and the best mode in which we have contemplated applying that principle, so as to distinguish it from other inventions.

Our invention relates to reels and particularly to reels such as are employed in rod-mills and the like for reeling up rods, as they come from the rolls, into bundles of convenient size for transportation and for use with the wire-drawing machines to which they are next taken in the general process of making wire from billets.

The object of such invention is to provide a device that will be able to readily and automatically accommodate itself to changes in the rate at which the rod is supplied to it, that will permit of the prompt discharge of the bundle when the latter has been wound up; and that will be withal simple in construction and easy of operation.

To the accomplishment of the above and related ends, said invention consists of means hereinafter fully described and specifically set forth in the claims.

The annexed drawings and the following description set forth in detail certain mechanism embodying the invention, such disclosed means constituting, however, but one of various mechanical forms in which the principle of the invention may be used.

Figure 1:
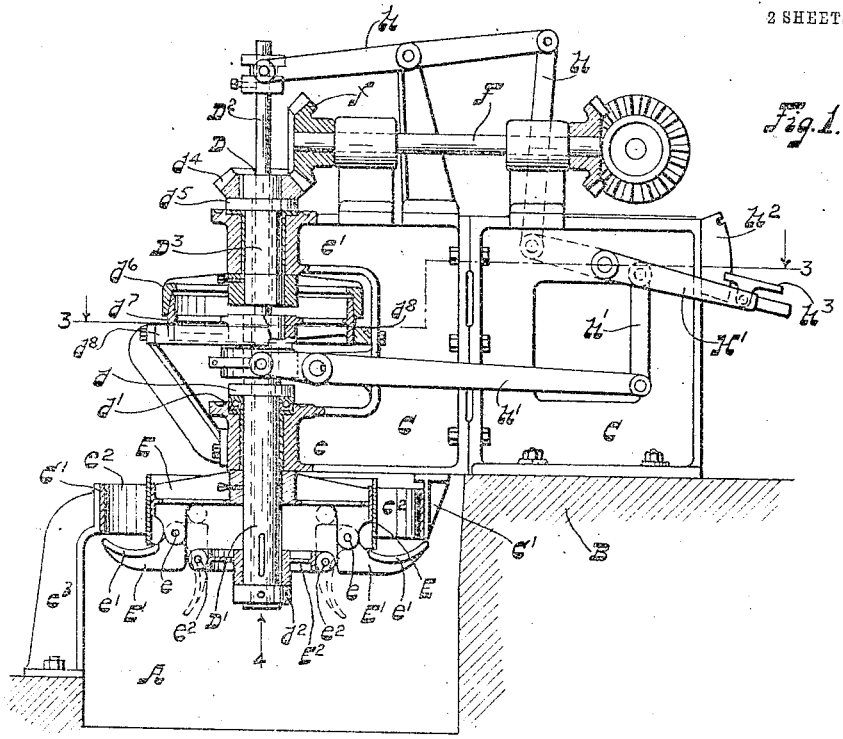
Figure 4:
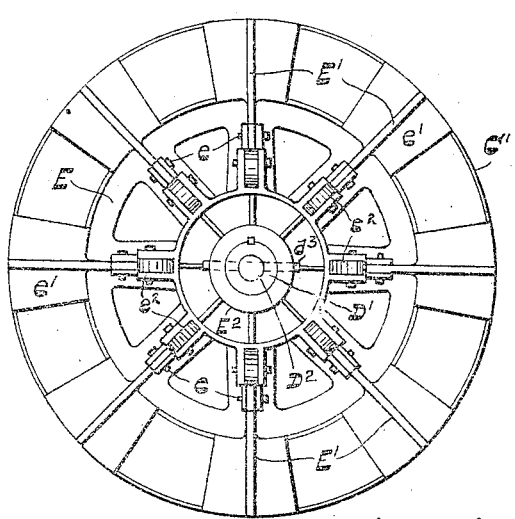
Figure 2:
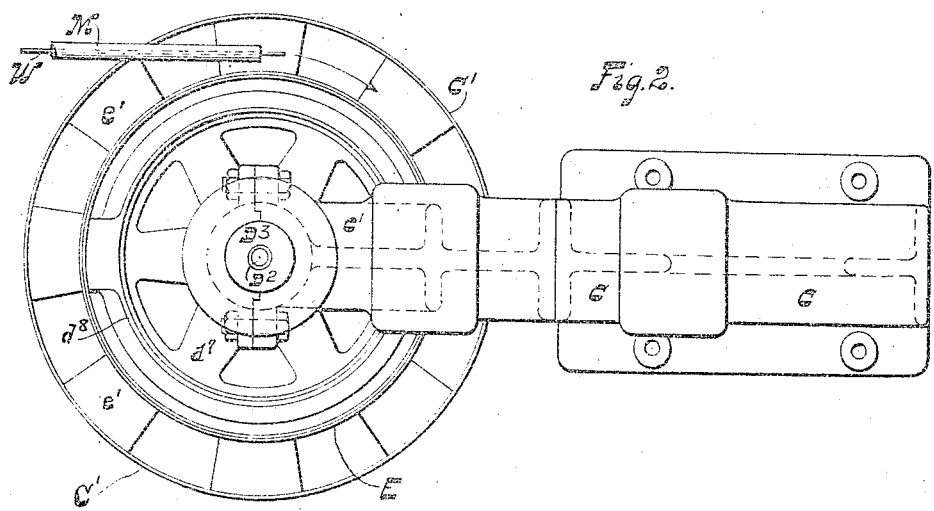
Figure 3:
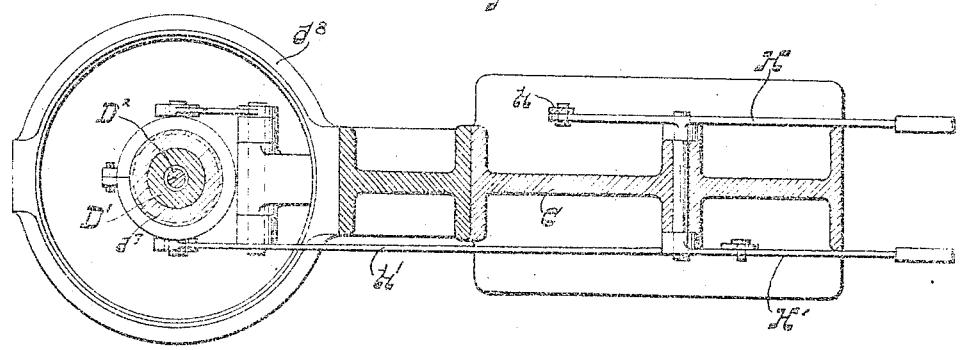

In said annexed drawings: Figure 1 represents a side elevation of a reel for a rod-mill embodying our invention, a portion of the device appearing in central vertical cross-section; Fig. 2 represents a plan view of the same with portions of the driving and controlling mechanism omitted; Fig. 3 is a longitudinal transverse cross-section taken on the line 3—3, Fig. 1; and Fig. 4 is a plan view from below, and on a slightly enlarged scale, of the reel proper, of our machine, the direction of view being indicated by the arrow 4, Fig. 1.

It will, of course, be understood that the relative disposition of the parts of our improved reel as shown in the foregoing figures is intended to be merely suggestive. Thus the form of the frame in which such parts are mounted, as well as to a certain degree the arrangement of such parts therein, will vary with different situations to conform with the position of the mill in combination with which the reel is intended to operate. Having made this explanation, then, we shall proceed with a detailed description of the machine as adapted for use in a particular situation.

As indicated in Fig. 2, our reeling machine is placed so as to face the mill, *i. e.* the rolls that form the rod. This latter is not represented, the guiding tube M, however, through which the rod W is brought to the reel, serves to indicate its relative position. Transversely of the reeling machine and directly below the reel proper is provided an open passage-way A of dimensions such as to accommodate a suitable conveyer, not shown, or other means for removing the bundles as fast as they are wound up and discharged from the reel. The foundation B, upon which we solidly mount the frame C of our machine, is, of course, properly conformed to meet the above requirements. Such frame C is provided with two arms $c$ $c'$ that project outwardly over the conveyer space or passage-way A above described and in these arms is mounted a vertical shaft designated in general by the letter D that will be more particularly described later. The lower end of this shaft D lies centrally within an annular member C' suitably supported at one side on a standard $c^3$ and at the other by being attached to frame C, as clearly appears in said Fig. 1. The inner face $c^2$ of annular member C' is preferably substantially perpendicular and quite smooth. Such lower end of shaft D, to more specifically describe the structure of the same, comprises a sleeve D' mounted in suitable bearings in projecting arm $c$ and provided near its upper end with a collar $d$ that rests upon ball-bearings $d'$ on the upper side of such projecting arm. Immediately below this arm $c$ there is rotatively mounted on sleeve D' a drum E. Drum E, it is accordingly seen, will lie within annular member C' and the difference between the diameters of the drum and the annular member is sufficient to leave ample room for the largest bundle that it is desired to wind upon the machine. Equiangularly disposed about the outer edge of drum E is a number of fingers E', Figs. 1 and 4, independent of each other and pivotally mounted on axes $e$ transversely disposed with respect to the corresponding radii of said drum. As shown in Figs. 1 and 4, these fingers E' when horizontally extended reach across the space intermediate of the outer face of the drum and the inner face of the annular member C' surrounding the same. Normally, however, the force of gravity exerted on the free ends e' of the fingers, which are preferably of the spatulate, slightly upwardly curved form shown, will cause such fingers to hang pendent, the positions thus occupied being indicated in dotted outline in Fig. 1.

To actuate fingers E' to assume their extended positions, we provide on the lower end of sleeve D', intermediate of drum E and a collar $d^2$, a disk $E^2$ rotatively secured to such sleeve but free to move axially thereon within the limits indicated. Mounted upon the periphery of this disk $E^2$ are rollers $e^2$, equal in number to that of fingers E' and disposed so as to respectively contact with the heels of said fingers. The axes $e$, on which fingers E' are pivoted, being higher than the rollers $e^2$ when the disk $E^2$ occupies its lower position, it is evident that the fingers under such circumstances will be firmly locked in their horizontally, or radially, extended positions. Raising and lowering of disk $E^2$ is effected as desired by raising or lowering an inner shaft $D^2$ extending the entire length of shaft D and connected at its lower end to such disk by means of a pin $d^3$, Fig. 4, oppositely disposed slots in sleeve D' permitting such connection. A hand lever H, shown by dotted lines in Fig. 1 and by full lines in Fig. 3, connected by means of suitable intermediate levers $h$ with the upper end of inner shaft $D^2$, serves as a convenient means for operating such shaft in the manner just described.

To rotate sleeve D' and the drum E mounted thereon, which, with its appurtenances, forms the reel proper, we provide a driving member $D^3$ in the form of a sleeve journaled in a suitable bearing in the end of projecting arm $c'$ of the frame, and, like sleeve D', provided with a collar $d^5$ that rests upon the upper face of said arm. On its upper end such sleeve $D^3$ bears a bevel gear $d^4$ that meshes with a similar bevel gear $f$ mounted upon a horizontal driving shaft F. On its lower end sleeve $D^3$ bears an internally coned friction clutch-member $d^6$ that is adapted to engage an externally coned friction clutch-member $d^7$ keyed on the upper end of the sleeve D'. Clutch-member $d^7$ may be raised so as to be operatively engaged by member $d^6$ whenever desired by means of a hand-lever H', similar in form and disposition to hand-lever H, that is connected with such clutch member through suitable intermediate levers $h'$ as will be readily understood.

The friction-face of clutch-member $d^7$ is made to slant both ways. The upper portion of the face is the one already referred to as being engaged by clutch-member $d^6$ when member $d^7$ occupies its upper position. The other portion of the face is designed to be engaged in a similar manner, when such member occupies its lower position, by a fixed clutch member $d^8$ securely attached to the frame C. In order to hold shiftable clutch-member $d^7$ in either of its two positions, a notched segmental plate $h^2$ and catch $h^3$ co-acting therewith, or any equivalent means, are provided in connection with hand-lever H', Fig. 1.

Having thus fully described our invention, the manner of operation of the same may be readily shown. While the machine is in use, drive-shaft F is kept constantly going at such a rate of speed as will effect the rotation of the reel proper, at the required maximum speed. Moreover, preliminarily to beginning reeling up the bundle hand-lever H is swung and fixed to lock the fingers E' of such reel in their extended positions. The end of the rod being then introduced into the reel through guiding tube M, is wrapped several times about drum E so as to be held thereto as the same revolves. To effect such revolution it is merely necessary to shift clutch member $d^7$ into its upper position in contact with member $d^6$ which is readily done by moving hand-lever H' into the position indicated in Fig. 1. This operation continues until the full length of the rod has been received and wound up on the reel. The driving mechanism of the wheel being connected with that of the rolls that form the rod, it is apparent that the speed of the former can be adjusted by suitable intermediate gearing to rotate the reel at very nearly the right speed to take up the rod as fast as it comes from the mill. In case the rod is not received fast enough, the friction clutch is adapted to yield sufficiently to avoid any undue tension on the rod or strain on the machine. When a coil or bundle of rod has thus been wound up, by a simple operation of hand-lever H', clutch-member $d^7$ is disengaged from driving member $d^6$ and braked by being lowered into contact with fixed clutch-member $d^8$. The rotation of the reel is thus caused immediately to cease, and thereupon, by means of the other lever H, inner shaft $D^2$ of vertical shaft D is raised and disk $E^2$ of the reel is actuated to release fingers E'. The latter under their own weight and that of the bundle resting upon them, forthwith swing into their pendent positions, and the bundle being no longer supported thereby, drops through and falls upon the conveyer by which it is carried away. One bundle having been thus wound up and discharged, the fingers are again raised and fixed in their projecting positions and as soon as the end of the next wire is received the machine is ready to wind it up.

The operation of our improved form of reel is thus seen to be practically continuous and by means of it we are enabled to reel up rods much more rapidly than has heretofore been possible. At the same time the device is of simple and compact construction, and requires a minimum of attention in its operation. These features will undoubtedly render our reel of value in a number of other situations besides the one shown, that of its use in a rod mill, and minor changes may be required to adapt to some of these; but we would set forth as our invention the principle of such reel's operation independent of the particular means wherein they are embodied.

Having thus described our invention in detail, that which we particularly point out and distinctly claim, is:—

1. In a reel for rod mills, and the like, a drum revolubly mounted on a vertical axis, a plurality of gravitating fingers pivotally mounted upon said drum and respectively adapted in one position to extend substantially horizontal, and in another position to hang pendent and lie within the circumference of said drum, and a vertically movable disk centrally located within the drum and disconnected from the fingers, said disk being adapted to bear against and position said fingers and lock them in extended position until the disk is opposite the pivotal center of each finger, when all of the fingers are suddenly released by said disk and drop by gravity.

2. In a reel for rod mills, a drum revolubly mounted on a vertical axis, a plurality of gravitating fingers pivotally mounted about the outer edge of said drum on axes transversely disposed with respect to its radii and respectively adapted in one position to extend horizontally, and in another position to hang pendent and lie within the circumference of said drum thus leaving an unobstructed space between the drum and annular member, a disk vertically reciprocable within said drum, and rollers radially secured to the periphery of said disk and disconnected from the fingers, said rollers when moved downwardly being adapted to bear against the rear portion of said fingers to actuate the same outwardly and lock them in extended position until the disk is moved opposite the pivotal center of each finger, when all of the fingers will be suddenly released by said disk and drop by gravity into a pendent position below said disk.

Signed by us this 21st day of April, 1906.

CARL W. CARLSON.
JOHN P. NYSTROM.

Attested by:
G. W. SAYWELL,
JNO. F. OBERLIN.